United States Patent [19]

Lamb et al.

[11] 4,257,110

[45] Mar. 17, 1981

[54] RECOGNITION MEMORY WITH MULTIWRITE AND MASKING

[75] Inventors: Sydney M. Lamb, Berkeley; Randall C. Smith, Walnut Creek, both of Calif.

[73] Assignee: Semionics Associates, Inc., Orinda, Calif.

[21] Appl. No.: 28,458

[22] Filed: Apr. 9, 1979

Related U.S. Application Data

[63] Continuation-in-part of Ser. No. 788,796, Apr. 19, 1977, Pat. No. 4,149,262.

[51] Int. Cl.³ .............................................. G11C 15/00
[52] U.S. Cl. ......................................... 365/49; 364/200
[58] Field of Search ........................... 365/49; 364/200

[56] References Cited

U.S. PATENT DOCUMENTS

| 4,069,473 | 1/1978 | Vitaliev et al. | 365/49 |
|---|---|---|---|
| 4,144,564 | 3/1979 | Lamb | 365/49 |
| 4,145,737 | 3/1979 | Lamb et al. | 365/49 |
| 4,149,262 | 4/1979 | Lamb et al. | 365/49 |
| 4,163,288 | 7/1979 | Vinot | 365/49 |

*Primary Examiner*—Terrell W. Fears
*Attorney, Agent, or Firm*—Hopgood, Calimafde, Kalil, Blaustein & Lieberman

[57] ABSTRACT

An improved associative memory employs plural separately addressable memories, e.g., random access memories (RAM's), which may be written into, or read from in conventional fashion. In a recognition mode, information is read from differing memory locations, and compared with an operand supplied on a data bus by a central processing unit (CPU), comparator apparatus being common for an array of storage locations. The comparison results, determined in accordance with a CPU-specified criterion, are then communicated back to the processor.

In accordance with specific aspects of the present invention, masking and/or multiwrite features are provided to permit bit reading/writing/searching, rapid memory writing, to facilitate logical and arithmetic data processing and the like.

13 Claims, 6 Drawing Figures

RECOGNITION MEMORY WITH MULTIWRITE AND MASKING

This application is a continuation-in-part of our co-pending application Ser. No. 788,796 filed Apr. 19, 1977 for ASSOCIATIVE MEMORY DEVICE WITH VARIABLE RECOGNITION CRITERIA, issuing Apr. 10, 1979 as U.S. Pat. No. 4,149,262, the disclosure of which is incorporated herein by reference.

DISCLOSURE OF INVENTION

This invention relates to electronic data processing apparatus and, more specifically, to an improved associative memory.

In many data processing applications of current day interest, an array of stored information must be sorted, or a subset of entries selected, based upon specific criteria. Illustrative such applications are to select entries from an array based upon zip code, income, name, family composition, employment history, skills, technical results, size or the like. Such criteria may require an exact match (e.g., age=49), or an inequality (age under 49, or at least 49).

Such data processing is often done on a software basis in a central processor itself under stored program control, i.e., where a possibly relevant file entry is fetched to CPU (core) memory, and compared with an operand pursuant to the obtaining criteria. Alternatively, the recognition function may be implemented on a hardware rather than a software basis, with the usual speed advantage-cost disadvantage tradeoff vis-a-vis software data processing. However, such prior art associative memories have heretofore been complex and expensive, employing bit-by-bit combined storage and comparison structure.

It is thus an object of the present invention to provide an improved associative memory.

More specifically, it is an object of the present invention to provide an improved associative memory where a relatively large amount of information stored in a memory may be examined in conjunction with a then obtaining, changeable match or recognition criterion and operand data, employing a relatively small amount of comparison hardware equipment.

It is a further object of the present invention to provide an associative memory which may be relatively simply and inexpensively constructed, and readily employed.

Yet another object of the present invention is the provision of an associative memory which provides data masking and multiwrite features to permit bit reading/writing/searching, rapid memory writing, facilitates logical and arithmetic data processing and the like.

The above and other objects of the present invention are realized in a specific, illustrative recognition or associative memory employing a plurality of memory modules of the random access type (RAM). The RAM's may be interrogated or written into a per se conventional manner. During a recognition mode operation, information from a subset or all of the addresses in any RAM are read out seriatim (RAM parallel) under central processor unit (CPU) control at locations specified by an address bus. The information so derived is examined by comparator apparatus common to plural storage locations which determines whether or not the criterion employed is satisfied.

In accordance with varying aspects of the present invention, the criterion may require an exact match, or to characterize data in accordance with varying inequality relationships. The comparator output signals are then batched and supplied to the CPU for further processing. Further, data masking and multiwrite features are included to permit bit reading/writing/searching, rapid memory writing, facilitates logical and arithmetic data processing, and the like.

The above and other features and advantages of the present invention will become more clear from the following detailed description of specific, illustrative embodiments thereof, presented hereinbelow in conjunction with the accompanying drawings, in which:

Figure 1A:
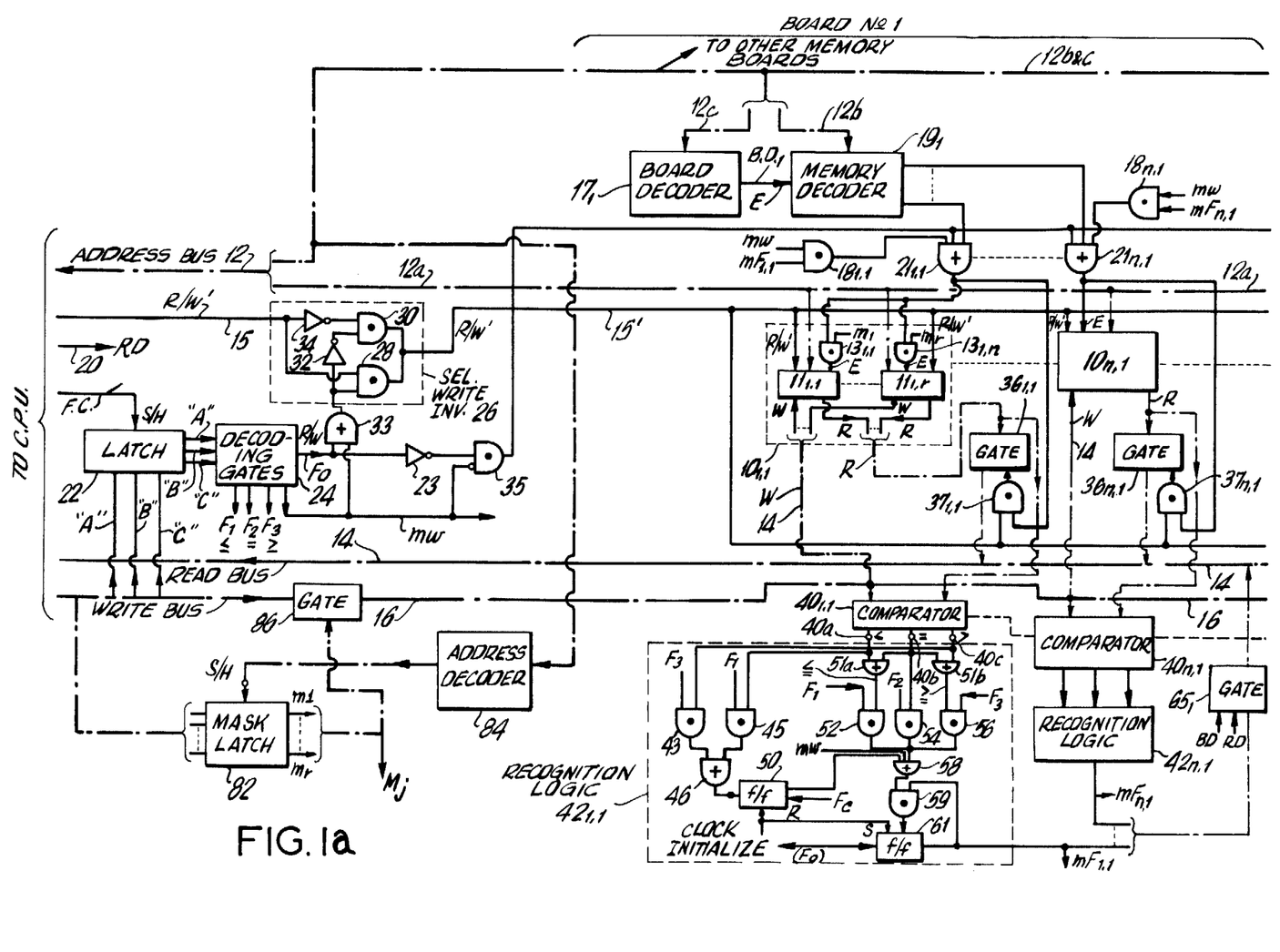
FIGS. 1A and 1B are the left and right portions of a schematic diagram of a first illustrative associative memory in accordance with the principles of the present invention.
Figure 1B:
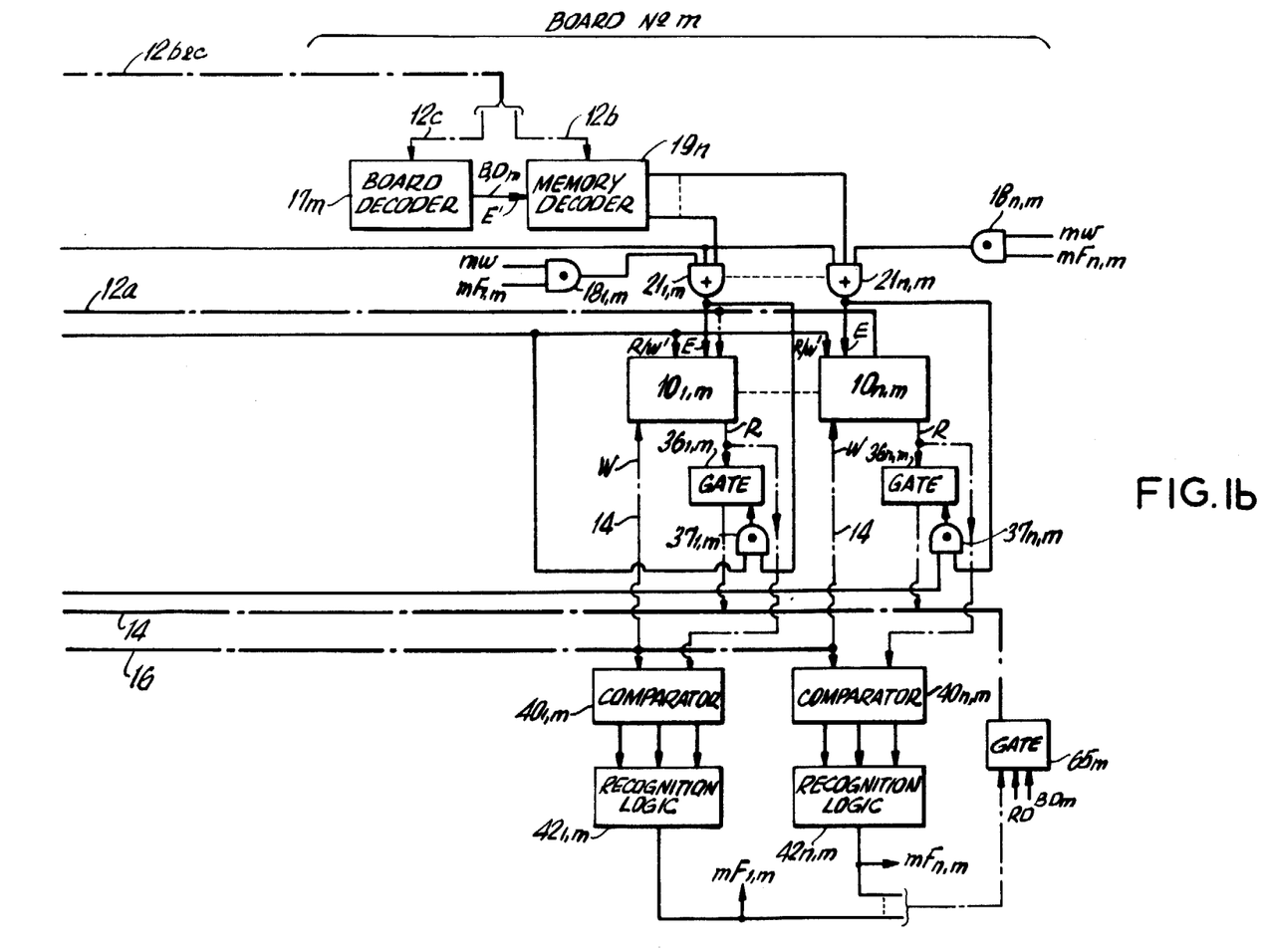

Referring now to FIGS. 1A and 1B, hereinafter referred to collectively as composite FIG. 1, there is shown an improved associative memory embodying the principles of the present invention adapted for use in data processing equipment (e.g., under control of a conventional central processing unit such as a microprocessor, minicomputer, or general or special purpose digital computer). The composite associative memory shown in FIG. 1 employs a plural conductor address bus 12 for receiving address information from the CPU (where RAM memories are employed), a read bus 14 for supplying processed information to the central processing unit, and a write bus 16 for receiving information from the central processor. The read and write buses 14 and 16 may, of course, be combined.

A plurality of memory modules 10 are included in the memory. For purposes of concreteness and not limitation, it will be assumed that the memory modules 10 each comprise a random access memory (RAM) including a plurality of storage locations. Again for purposes of illustration only, it will be assumed that each $RAM_{i,j}$ of the array of RAM's is the i-th RAM located on the j-th of plural, expandable circuit boards where i and j are independent positive integers. Each RAM module $10_{i,j}$, in turn, is formed of a plurality of one-bit RAM's 11 for purposes below discussed.

In the FIG. 1 embodiment, associated with each RAM module $10_{i,j}$ is a multi-bit comparator $40_{i,j}$ having three outputs $40a$–$40c$ connected to an associated recognition logic module $42_{i,j}$. The output of the several recognition logic modules $42_{i,j}$ are coupled by buffer (e.g., AND) gates 65 to the read bus 14 for communication back to the central processor. As used herein, "AND" and "OR" gates will generically identify coincidence and disjunctive Boolean operations, respectively.

The CPU has conventional read/write access to each of the RAM memory modules $10_{i,j}$ for registering information therein (write operation) or for reading information therefrom (read operation) under partial control of a read/write control line 15 emanating from the CPU. In alternative data processing construction separate read/write lines may be employed. In particular, for example to write information into a memory address, the full memory address to be accessed is loaded onto the address bus 12. The least significant address digits are impressed on address bus conductors $12a$ which are supplied to each of the memory modules 10 to identify one of the plural addresses in each such memory. The most significant address digits, present on address bus conductors 12c are supplied to a board decoder $17_j$ on each board, the decoder $17_j$ providing an output signal only when the address on composite address bus 12 in fact resides on the j-th board. Similarly, once enabled by the associated board decoder $17_j$, a memory module (RAM) decoder $19_j$ receives the address conductor digits on address lines 12b of intermediate significance, and enables a specific one of the memory modules $10_{i,j}$ associated with that decoder, acting through a following OR gate $21_{i,j}$. Thus, only the proper RAM 10 containing the address in which information is to be inserted is enabled by the activated output of the associated memory module decoder $19_j$ and the particular address in the RAM is then specified by the address on the least significant address bus digit conductors 12a.

Coincident with the address selecting operation, the read/write line 15 is supplied with a "write" signal which passes unchanged through a selective write signal inverter 26, a latch 22 having stored therein information specifying that a write operation was to be conducted (ultimately, an activated $F_0$ output of decoding gate 24). The latch 22 and following mode decoder gates 24 may simply be controlled directly by the CPU, via a function change (F.C.) line. Accordingly, the $F_0$, or read/write (non-recognition, non-multiwrite) signalling operation output of the latch decoding gates 24 signals that a read or write (and not "recognize" or "multiwrite") operation is to occur and enables an AND gate 28 via an OR gate 33 to pass the "write" signal impressed on lead 15 by the CPU unchanged to condition the selected RAM $10_{i,j}$ for a write operation. Accordingly, the selected RAM $10_{i,j}$ having been supplied with an enabling signal by decoder $19_j$ via gate $21_{i,j}$ and a particular address by the address bus portion 12a, simply inserts the CPU-supplied information on write bus 16 passing through normally enabled gate 84 into the appropriate memory location. The incoming word has one bit thereof stored in each RAM module 11 at the selected RAM $10_{i,j}$.

A read operation occurs in a manner substantially identical with that described above with respect to a write operation. When a "read" is encountered, the output of decoding gate 24 again passes the read signal unchanged through AND gate 28 and signals the RAM's 10 that a memory read is to be effected. The read signal proximately supplied by the CPU on conductor 15 also activates bus gate 36 associated with the active, address bus 12b, 12c—selected RAM $10_{i,j}$ acting through an AND gate $37_{i,j}$ which is supplied with both the read signal, and also the RAM $10_{i,j}$ selecting signal output of the decoder $19_j$ and gate $21_{i,j}$. The particular RAM $10_{i,j}$ is again selected by the address bus constituents 12b and 12c and the decoders $19_j$ and $17_j$ in the manner discussed above with respect to a write operation while, as before, a particular address in the selected RAM is activated under the control of the least significant activated digits present on the bus constituent 12a. Such signalling prevailing, information at the specified address location of the selected RAM 10 is read out, passes through the activated associated gate $36_{i,j}$ and is impressed on the read bus 14 for communication back to the CPU.

To effect an associative memory operation of the instant invention, a particular match criterion is entered into the now F.C.-line enabled (sample mode) latch 22 via the digits "A"–"C" loaded by the CPU onto predesignated conductors of the write bus 16. Three of the possible Boolean variable combinations for the variables "A"–"C" specify whether a "less than", "equal to", or "greater than" match standard is to be employed, i.e., whether the match standard-specifying signal is present at the output $F_1$, or $F_2$, or $F_3$ output of decoding gates 24 connected to the latch. It will be appreciated that all decoding gates of the instant invention, e.g., 17, 19, 20, 24 70 and/or 84 may simply comprise inverters and AND gates having inputs organized to respond only when a preselected binary digit pattern is supplied thereto. A fourth possible "A"–"C" variable combination for the contents of latch 22 will excite the $F_0$ output of decoding gates 24 previously discussed, to specify that a memory read or write operation rather than a recognition operation is to be effected, and see below for multiwrite ("mw") functioning. Moreover, a CPU-emitted write signal present on conductor 15 will be inverted by selective write inverter 26 during any associative compare operation, since the $F_0$ output of the decoding gates 24 is in the inactive state during the associative mode.

Assume now that a specific recognition function is required, e.g., that data in the memory 10 is to be compared with data on the write bus 16 to determine whether or not the two identically correspond (the "equal" match criterion identified to the apparatus by appropriately loading latch 22 with "A"–"C" variables which enable the $F_2$ output from decoding gates 24). The CPU specifies an address of a particular cell in all RAM's 10 to be interrogated via the address bus portion 12a common thereto. The RAM modules 10 are all coincidentally enabled by the $F_0$ signal inverted by element 23 (active inverted $F_0$ signalling one of the active three recognition mode functions) acting through OR gates 21. Coincidence gates 13 and 35, used for multiwrite purposes below discussed, are normally enabled during this time and operation. Since an association memory function is being requested by the CPU, the CPU supplies a write signal on the read/write control conductor 15 which is inverted by inverter 34, passed by an AND gate 30 to the read/write conductor 15', and impressed as a read signal on all RAM's 10. Accordingly, the information stored at the bus 12a—specified RAM address is read out from each RAM $10_{i,j}$ and is communicated to its associated comparator $40_{i,j}$, together with the operand ("comperand") then impressed onto the write bus 16 by the CPU. It is noted that this recognition function thus corresponds to a simple "write" command for the CPU, but which is transformed to a memory read by the selective write inverter 26.

Each comparator $40_{i,j}$ responds to the two input signals supplied thereto, one read out from the associated RAM location and the other supplied via the write bus 16, and enables one of three output terminals 40a, 40b or 40c depending upon whether the data read out from the RAM is less than, equal to, or greater than the operand on the data bus 16, respectively. The outputs of each comparator $40_{i,j}$ are supplied to an associated recognition logic circuit $42_{i,j}$, one such circuit 42 being shown in detail in FIG. 1. For the assumed case where an "equal to" operation is specified (enabled $F_2$ signal), an AND gate 54 supplied with both the $F_2$ signal and the output port 40b of the comparator will be energized if the equality condition is met, but not otherwise. Correspondingly, AND gates 52 and 56 cannot have their logical conditions satisfied when the "equal to" match criterion prevails, since their $F_1$ and $F_2$ inputs are inactive at such time. Thus, the AND gate 54 makes the recognition decision during "equal to" signal processing. Similarly, the gates 52 and 56 respectively become the decision elements when "less than or equal to" or "greater than or equal to" criteria are in force under control of the $F_1$ and $F_3$ signal outputs of latch 22 and its decoding gate 24.

An OR, disjunctive logic function is effected between the outputs of the gates 52, 54 and 56 (a wired OR being shown in the drawing) and the output passes through an OR gate 58 and AND gate 59 employed for purposes below discussed to the input of a flip-flop 61, e.g., a J-K flip-flop which is clocked (as by a clock signal derived from the memory write command) during each testing cycle. The flip-flop 61 (and thus also AND gate 59) is provisionally set at the beginning of an associative memory function (e.g., by a last obtaining read or write $F_0$ signal as desired). At the completion of a recognition cycle of operation, the state of the flip-flops 61 in the recognition logic circuits 42 may be read out on a board-by-board basis by a command on lead 20 from the CPU to issue a read (RD) signal to open the gate $65_j$ on the j-th board (together with bus $12b, c$ furnished BD address signals), thereby connecting the ensemble of flip-flop output signals reflecting j-th board recognition results to the read bus 14 for communication to the CPU.

A further discussion will now be directed to the recognition logic circuits 42 and, in particular, with respect to the circuit $42_{11}$ shown in detail in FIG. 1. In its overall operation as above described, the flip-flop 61 is provisionally set at the beginning of a recognition mode of operation, and is clocked each time a new recognition test is effected. If the recognition function is satisfied for the data being examined, one of the gates 52, 54 or 56 will provide an enabled output signal (depending upon which test is specified by the selected output $F_1$, $F_2$ or $F_3$ from the decoding gate 24) to continue the set state of flip-flop 61 acting through gates 58 and 59. Thus, for example, a number of stored entries in the memory 10 may correspond to different bytes of a composite informational character or record. The different bytes may thus illustratively comprise name, age, address, alphanumeric information, and the like of any kind or description. Depending upon how extensive the recognition requirement, any subset or all of the bytes of each stored record may be successively addressed and tested, such that the flip-flop 61 will remain set only if all tests are satisfied. If any one test is not satisfied, the clock at the input of the J-K flip-flop 61 where the test (recognition) operation is being effected, together with the absence of any enabled output of the AND logic 52, 54 or 56 acting through gate 58 will cause a zero to be stored in the flip-flop. The AND gate 59 assures that the flip-flop 61 will not be reset should a later recognition test succeed. This cleared state of flip-flop 61 on functional CPU reading via gate $65_j$ will advise the CPU that at least one of the comparison tests for the bytes reviewed has failed. Alternatively, if a "1" is communicated to the CPU the processor is advised that all of the tests have succeeded (a "recognition").

One other aspect of the operation of recognition logic 42 requires attention. This involves operation in a "less than or equal to" or a "greater than or equal to" mode associated with activated control signals $F_1$ or $F_3$, respectively. For example, if two numbers are being compared on a serial digit by digit basis, e.g., if a question is being asked, "is a number read out from memory (e.g., "1953") greater than or equal to the CPU-supplied number (e.g., "1945"), and the characters are examined from most to least significant, if it is once determined that a digit in the number read out from the RAM (assumed "1953") is greater than the corresponding digit in the operand comparison word (assumed "1945"), then the tested number ("1953") is greater than the operand ("1945") even if a test of a later digit fails. With particular regard to the two numbers in the illustration, once it is determined that the "5"digit in "1953" is greater than the "4" digit in "1945", then "1953" exceeds "1945" even though a succeeding digit test will fail ("3" less than "5" for the units digit).

To attend to such a logical proposition for the "greater than or equal to" case, if a comparison is made on any digit causing either output $40b$ or $40c$ of comparator $40_{11}$ to be high together with the presence of the $F_3$ control, a coincidence gate 43 and disjunctive (OR logic gate $51b$ and 46 set a flip-flop 50 which will thereafter provide a match signal to the flip-flop 61 through the OR gate 58 and AND gate 59 to assure that the "1" set information in flip-flop 61 is preserved notwithstanding that any later less significant digit test fails. The AND gate 59 is employed to assure that once a test on a more significant digit has failed, that a later "greater than" signal will not inadvertently restore the flip-flop 61 to its set condition. In a mode of operation similar to that described above, control signal $F_1$ operates in conjunction with the comparator outputs $40a$ or $40b$ and gates $51a$, 45 and 46 to preserve a "less than or equal" recognition once obtained.

Thus the FIG. 1 arrangement has been shown by the above to provide for reading and writing into any RAM location under CPU control and, moreover, to test the stored contents at any memory location against an operand supplied on the write bus on either an equality or inequality basis.

The embodiment shown in FIG. 1 is of substantial improvement over prior art associative memories in that each comparator 40 is associated with and common to an entire array of storage locations in RAM memory. This contrasts with prior associative memories where comparison logic is employed at each storage location, thereby greatly increasing the hardware required.

Figure 2A:
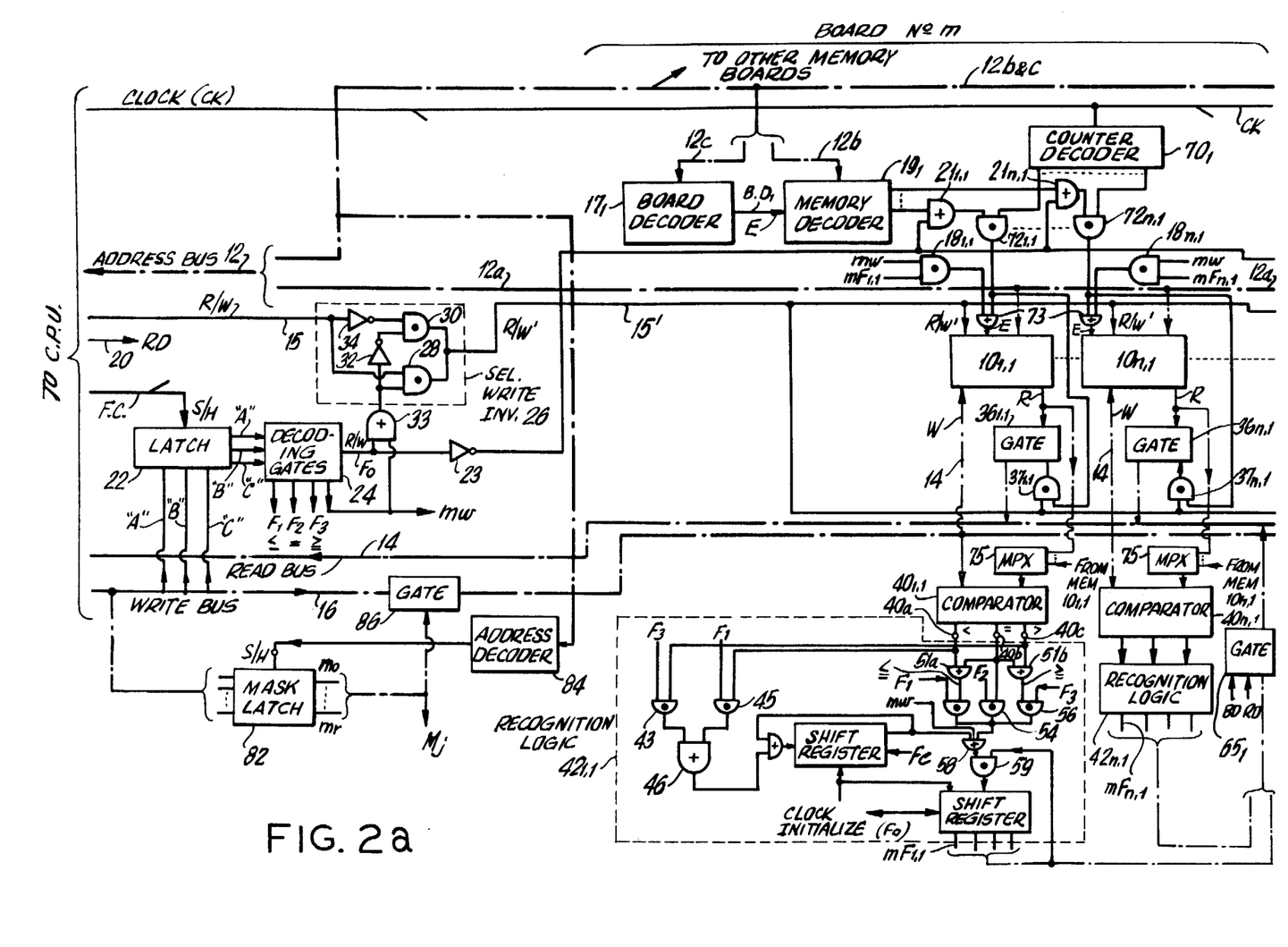
FIGS. 2A and 2B are the left and right portions of a diagram which schematically depicts a second RAM embodiment in accordance with the present invention.
Figure 2B:
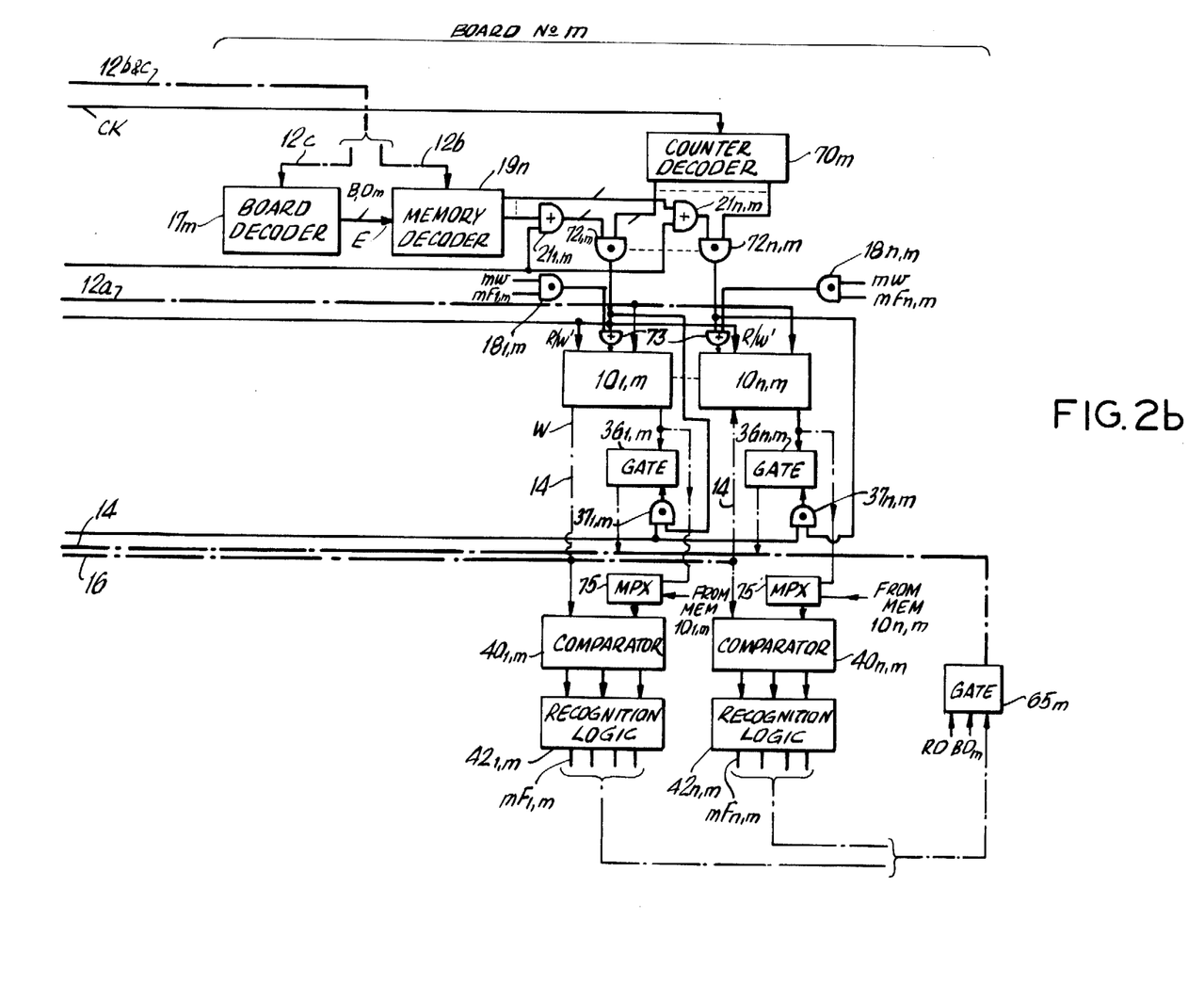

An even greater hardware saving vis-a-vis the prior art arrangements is shown in the embodiment of FIGS. 2A and 2B (hereinafter referred to as composite FIG. 2) which effectively multiplexes several RAM's 10 as inputs to each comparator 40. In FIG. 2, like reference numbers vis-a-vis FIG. 1 identify like components. In the embodiment of FIG. 2 the comparators 40 are no longer in one to one correspondence with the RAM's 10, but rather each comparator 40 services a subset of the RAM's 10 included on any particular memory board. More specifically, it will be assumed that each associative memory operation required of a RAM group, e.g., a group on a circuit board, is subdivided into a plurality of sequential operations (e.g., four), and that the CPU supplies a series of clock (CK) pulses such that four clock pulses subdivide each interrogation cycle into four parts. A clock pulse modulo-4 counter-decoder 70 and gates 72 and 73 on each board effectively subdivide the array of memories $10_{i,j}$ on each board into four groups, and sequentially connect sets of four RAM's with the four comparators 40 via four multiplexers 75.

Accordingly, the outputs of the comparators 40 during each of successive clock cycles during recognition mode functioning, comprise four digits which respectively characterize the four inputs read from the four RAM locations interrogated by the CPU.

In the multiplexed embodiment of composite FIG. 2, the recognition logic 42 flip-flops 50 and 61 of the FIG. 1 arrangement are replaced by four stage shift registers 80 and 81 for the assumed modulo-4 multiplexing of the counter-decoders 70, and the comparison results developed during the four test subcycle portions stored in separate stages of the shift registers 80 and 81. Thus, instead of a single storage stage (flip-flops 50 and 61 in FIG. 1), each test is contained in a separate stage of the self-looping shift registers 80 and 81. At the completion of a recognition mode operation, the recognition result information in the shift register 81 stages are gated out by the gate 65 for communication to the CPU by way of the read bus 14. That is, rather than having n separate outputs on a one-each basis from flip-flops 61 in the FIG. 1 arrangement, the requisite n signals are present at the n parallel outputs of plural shift register stages 81. Similarly, the four stage shift register 80 preserves a recognition once made for data read from a particular, associated, RAM for an inequality mode operation.

Attention will now be directed to additional features of the instant invention, viz., a discussion of the bit masking capability of the apparatus followed by discussion of a multiwriting capability. The masking and multiwrite features are substantially identical in operative principle with respect to the embodiments of FIGS. 1 and 2. Accordingly, only the FIG. 1 embodiment will be discussed in detail—comparable equipment being shown in the drawing for FIG. 2. Returning to FIG. 1, and with respect to mask operation for the instant invention, a mask latch 82 is selectively loaded with bit masking information under control of an address decoder 84, e.g., operable responsive to a CPU enabling signal supplied via the address bus portion 12b and c. That is, when masking information is to be loaded into the latch 82, the CPU impresses a special code group (binary word pattern) on the address bus conductors 12b and c which is recognized by address decoder 84. The decoder 84 momentarily places the mask latch 82 in the sample rather than its normal hold mode to receive the requisite mask information from the CPU via write bus 16.

In the above discussion regarding FIGS. 1 and 2, it has been tacitly assumed that the mask latch 82 was loaded with all binary "1's" to fully enable data processing. In this state, the all "1" outputs $m_1$-$m_r$ maintain the gate 86 fully open thereby passing all write bus information for purposes above discussed; as well as enabling all of the AND gates 13 above discussed to enable all CPU addressed RAM's 10 and, more particularly, the one-bit RAM modules 11 thereof. However, it is sometimes desired that fewer than all of the bits in a memory word be accepted for reading, writing or the associative memory function. Thus, for example, inserting flag bits into memory addresses may require writing in only a single bit position, i.e., only a single one of the one bit RAM's 11 have an enabled gate 13 in each composite RAM module 10. There are, of course, intermediate cases where enabling more than one but fewer than all of the bits in a full word is desired for some purpose, e.g., byte reading/writing/searching, or the like.

To illustrate a writing operation employing masking, the masking information is first loaded into the mask latch 82 as above discussed. For purposes of simplicity, assume that a "1" digit is present only at the $m_1$ output of the mask latch 82. A following write command from the CPU on bus 15 in combination with the active $F_0$ output as above discussed passes the write signal uninverted through AND gate 28 to place the bit RAM's 11 in all RAM modules 10 in a write mode. However, since only the $m_1$ bit is activated at the output of mask latch 82, only the AND gates $13_{i,1}$ are enabled such that only the one bit on the write bus connected to the RAM module $11_{i,1}$ selected by the information on the address bus 12 will have the new information written therein at the address selected by the address bus 12. All other bits of the selected RAM 10 address will not have the contents thereof changed since the gates $13_{i,2}$-$13_{i,n}$ will not be enabled since the latch 82 outputs $n_2$-$n_r$ are low. Reading, of course, progresses in a substantially identical manner to read only the one digit identified by the active $m_1$ output from the address selected by the composite address bus 12.

In a similar manner the above described apparatus functions to employ the mask information during an associative mode of operation. To this end, only the RAM bit modules 11, 1 are enabled during the memory reading portion of the associative memory operation (again, caused by the write command on lead 15 inverted by inverter 34 before reaching conductor 15'). Accordingly, only the mask selected bit(s) (only one for the assumed case) pass to the comparator 40 and recognition logic 42 to effect the associative memory function. All other aspects of the comparison operation proceed as before.

Attention will now be directed to the multiwrite feature of the instant invention which may operate independently of or in concert with the bit masking structure above discussed. It is the purpose of the multiwrite operation to rapidly write information into responding locations during an associative mode of operation. Thus, for example, such multiwrite operation is desirable to insert a flag bit into those memory cells where a match against some criteria has previously been detected by associative processing above discussed. Such a flag bit may serve as an aid for later data processing or the like. While the discussion below and the drawing shows multiwrite for responding locations containing a match, it is obviously within the skill of the art to alternately provide multiwriting as well for non-responding locations where no match is loaded. Depending upon the data processing goals desired, it may be desirable to flag non-responding rather than responding locations.

To accomplish the multiwriting purpose, latch 22 is loaded under control of the function change (F.C.) signal via conductors "A"-"C", and decoded by the decoding gates 24 into an active "mw" or multiwrite output control lead. As a first function, the active mw signal passes through OR gate 33 to enable the AND gate 28 and disable the AND gate 30 through inverter 32 such that the read/write signal on lead 15 passes uninverted through the AND gate 28 to the conductor 15' to condition the various RAM modules 10 for reading or writing as desired. Typically, for the multiwrite function, of course, a write level signal is employed. Also for writing the appropriate mask bits $m_1$-$m_r$ are stored in the latch 82. For an illustrative flag bit application, the bit location in which the flag bit is to be written will be the only active or "1" digit of the array $m_1$-$m_r$.

During an associative mode of operation, when a match is detected (active $mF_{i,j}$ signal), the active $mF_{i,j}$ and mw signals enable an AND gate $18_{i,j}$ which enables the bit position(s) having a "1" level mask (m) input variable supplied to the AND gate 13 connected thereto. Accordingly, the appropriate flag condition then present on the write bus 16 (which passes for that bit position through gate 86 enabled by mask latch 82) into the appropriate bit location. By such processing, any desired word or bit pattern may be loaded into the RAM memory 10 responsive to match recognition (active mF) or an inactive, non-recognition or non-match (mF) signal. Accordingly, the multiwrite feature serves to very rapidly permit writing, data flagging, or the like during the associative mode of operation. Moreover, the data masking and multiwrite features can be utilized for logical and arithmetic operations. As just one instance, to increment a stored number by "1" a match in the least significant digit against a zero permits multiwriting of a "1" into each location; matching against a "1" criteria permits multiwriting of a binary "0" into that position with a "1" carry, and so forth.

The associative memories of FIGS. 1 and 2 have thus been shown by the above to permit all read, write, recognition masking and multiwriting functions required thereof and, moreover, to do so in an improved manner, efficiently using comparator hardware, processing logic and the like.

The above described arrangements are merely illustrative of the principles of the present invention. Numerous modifications and adaptations thereof will be readily apparent to those skilled in the art without departing from the spirit and scope of the present invention.

What is claimed is:

1. In combination in an associative memory, a plurality of random access memories each including plural random access memory modules comprising an enable port and plural information storage addresses, plural comparator means each connected to a different one of said random access memories for receiving information read out therefrom, data bus means connected to each of said memories and each of said comparator means, memory accessing means including common address bus means connected to said memories, each of said comparator means including means for comparing the information supplied thereto with information present on said data bus means and for developing an output signal representing the results of said comparison, means for storing said output result signals of said comparator means, bit mask register means including plural outputs, and masking logic means connecting said bit mask register outputs and said memory module enable ports for selectively enabling and disabling said memory module depending upon the outputs of said bit mask register means.

2. A combination as in claim 1 further comprising read gate means connecting the output of each random access memory module with said data bus means.

3. A combination as in claim 1 further comprising recognition logic means and comparison gate means serially connecting said comparator means with said data bus means.

4. A combination as in claim 3 wherein said comparator means comprises means for producing an output signal specifying whether or not the information supplied thereto from an associated random access memory module is equal to data present on said data bus means connected thereto, and where said storing means comprises bistable means connected to said comparator means for registering therein the comparison results produced by said comparator means.

5. A combination as in claim 1 wherein said random access memories are subdivided into subsets, and wherein said memory accessing means includes plural address decoding means each associated with a different random access memory subset connected to and responsive to said common address bus means for selectively enabling a selected one of said random access memory modules in said random access memory subset associated therewith.

6. A combination as in claim 1 wherein each of said random access memories comprises read and write control port means, read-write control conductor means connected to said read-write control ports of said random access memory modules, and means for selectively inverting a write command to thereby impress a read command on said read-write conductor means.

7. A combination as in claim 6 further comprising operational mode means for registering therein whether a read or write, or an associative memory function is required, said selective inverting means being connected to said operational mode means for selectively inverting a write command depending upon the state of said mode means.

8. A combination as in claim 1 further comprising central processor means connected to said data bus means and said memory accessing means.

9. A combination as in claim 8 wherein said data bus means includes separate read and write buses.

10. A combination as in claim 1 further comprising means for coupling the comparison result signals stored in said storing means to said data bus means.

11. A combination as in claim 1 further comprising associative mode signalling means connected to said plural random access memories for coincidentally enabling said plural random access memories.

12. A combination as in claim 1 further comprising multiwrite mode signalling means, and multiwrite logic means having inputs connected to said multiwrite mode signalling means and said output result storing means and an output connected to said random access memories for coincidentally enabling all memories associated with a like comparison result signal stored in said output result signal storing means.

13. In combination in an associative memory, a plurality of random access memories each including plural random access memory modules comprising an enable port and plural information storage addresses, plural comparator means each connected to a different one of said random access memories for receiving information read out therefrom, data bus means connected to each of said memories and each of said comparator means, memory accessing means including common address bus means connected to said memories, each of said comparator means including means for comparing the information supplied thereto with information present on said data bus means and for developing an output signal representing the results of said comparison, means for storing said output result signals of said comparator means, multiwrite mode signalling means, and multiwrite logic means having inputs connected to said multiwrite mode signalling means and said output result storing means and an output connected to said random access memories for coincidentally enabling all memories associated with a like comparison result signal stored in said output result signal storing means.

* * * * *

UNITED STATES PATENT AND TRADEMARK OFFICE
CERTIFICATE OF CORRECTION

PATENT NO. : 4,257,110

DATED : March 17, 1981

INVENTOR(S) : Sydney M. Lamb and Randall C. Smith

It is certified that error appears in the above—identified patent and that said Letters Patent are hereby corrected as shown below:

Claim 4, Column 9, line 66 -

"module is equal to data present on said data bus means"

should be

--module is equal to, greater than, or less than data present on said data bus means--

Signed and Sealed this

Second Day of June 1981

[SEAL]

*Attest:*

RENE D. TEGTMEYER

*Attesting Officer*  *Acting Commissioner of Patents and Trademarks*